United States Patent [19]

Yamashita

[11] Patent Number: 4,830,135
[45] Date of Patent: May 16, 1989

[54] AUTOBICYCLE

[75] Inventor: Aiji Yamashita, Tokyo, Japan

[73] Assignee: Honda Giken Kogyo Kabushiki Kaisha, Tokyo, Japan

[21] Appl. No.: 109,826

[22] Filed: Oct. 16, 1987

[30] Foreign Application Priority Data

Oct. 17, 1986 [JP] Japan ................................ 61-246949

[51] Int. Cl.⁴ ............................................. B62D 61/02
[52] U.S. Cl. .................................. 180/229; 123/41.7; 180/68.1; 180/68.2
[58] Field of Search ...................... 180/219, 229, 68.1, 180/68.2, 68.3, 225; 296/78.1; 123/41.7, 41.67, 41.61

[56] References Cited

U.S. PATENT DOCUMENTS

| | | | |
|---|---|---|---|
| 1,578,906 | 3/1926 | Morel | 180/225 |
| 4,010,812 | 3/1977 | Bothwell | 180/229 |
| 4,011,921 | 3/1977 | Sakamoto et al. | 180/229 |
| 4,334,589 | 6/1982 | Asakura et al. | 180/229 |
| 4,633,965 | 1/1987 | Tsurumi et al. | 180/229 |
| 4,678,223 | 7/1987 | Kishi et al. | 180/68.1 |
| 4,685,530 | 8/1987 | Hara | 180/229 |
| 4,697,665 | 10/1987 | Eastman et al. | 180/225 |
| 4,703,825 | 11/1987 | Mikami et al. | 180/68.1 |
| 4,722,412 | 2/1988 | Takemura et al. | 180/229 |

FOREIGN PATENT DOCUMENTS

| | | |
|---|---|---|
| 182973 | 8/1955 | Austria ................................ 180/229 |
| 0021657 | 7/1981 | European Pat. Off. . |
| 1002645 | 7/1957 | Fed. Rep. of Germany . |
| 2641444 | 3/1978 | Fed. Rep. of Germany ..... 180/68.1 |
| 62-283082 | 12/1987 | Japan . |
| 1481490 | 7/1977 | United Kingdom . |

Primary Examiner—Charles A. Marmor
Assistant Examiner—Eric Culbreth
Attorney, Agent, or Firm—Birch, Stewart, Kolasch & Birch

[57] ABSTRACT

An autobicycle wherein the cooling effect is improved without particularly increasing the wind introducing area of the autobicycle. The autobicycle comprises a partition wall located between a rear portion of an engine carried on a body frame and a body side cover for partitioning the inside of the body side cover to define front and rear sectional chambers. The body side cover continuously covers a range at least from a side portion of the engine to a location below a seat supported above the body frame and has one or more air admitting holes perforated therein. Air admitted into the inside of the body side cover thus cools the engine and some other components of the autobicycle in the front chamber and independently cools different components in the rear chamber.

8 Claims, 3 Drawing Sheets

AUTOBICYCLE

BACKGROUND OF THE INVENTION

This invention relates to an autobicycle in which a side portion of an engine is covered by a body side cover, and more particularly to a cooling structure for an engine or some other elements of an autobicycle having a body side cover of the full cover type which continuously covers a side portion of a body from the front to the rear.

Conventionally, it is a common art in autobicycles of the road sport type or the like to cover, with a fairing, a front half portion of a body from a location in front of a dash board to opposite sides of an engine carried between front and rear wheels in order to reduce the air resistance against and the dynamic lift to the autobicycle during running of the autobicycle at a high speed. Some autobicycles employ a full cover system wherein a body is continuously covered by a body side cover including a fairing which covers a front half portion of the autobicycle and a rear cowl which covers a rear half portion of the autobicycle. In such an autobicycle of the full cover type, various wind introducing ports are opened on a body side cover while a flow passage for a running wind is provided in the inside of the body side cover in order to utilize the inside of the body side cover as a kind of wind introducing passage which allows a running wind admitted into the inside of the body side cover to flow smoothly to built-in components such as an engine so as to effectively cool the engine and an inside portion of the autobicycle. This construction will present various good effects including prevention of thermal wear and interception of mechanical noises and hat wind. An autobicycle of such construction is disclosed, for example, in Japanese patent application No. 61-124775.

One of principal heat sources within a body side cover is the engine. In addition, when an autobicycle is of the water cooled type, also a radiator is one of the principal heat sources. If the inside of the body side cover is heated to a high temperature by the heat sources, a thermal influence will occur on functional parts and so on within the body side cover other than the heat sources. However, where the engine has a high output power, the amount of heat generated thereby is large. Accordingly heat is apt to remain within the body side cover. Particularly where the autobicycle is of the full cover type, the remaining heat is large in amount. Therefore, where heat sources such as an engine and some other functional parts and so on are covered with a body side cover, it is necessary to improve the effect of cooling the inside of the body side cover in order to reduce a thermal influence to be had on such other functional parts and so on as low as possible. To this end, the wind introducing area within the body side cover may be increased to improve the cooling efficiency, but it cannot be increased freely and is naturally restricted within a fixed range because there is an artificial restriction, for example, in the step width.

SUMMARY OF THE INVENTION

It is an object of the present invention to provide an autobicycle wherein the cooling effect is improved without particularly increasing the wind introducing area of the autobicycle.

In order to attain the object, according to the present invention, there is provided an autobicycle of the type which includes a body frame having an engine carried thereon and having a seat supported above a rear portion thereof, and a body side cover for continuously covering a range at least from a side portion of the engine to a location below the seat, the autobicycle comprising a partition wall located between a rear portion of the engine and the body side cover for partitioning the inside of the body side cover to define front and rear sectional chambers, and means for allowing air to be introduced into the inside of the body side cover in order to cool the insides of the front and rear sectional chambers independently of each other with the air introduced.

The front side sectional chamber may accommodate therein an engine and a radiator (where the autobicycle is of the water cooled type) which are principal heat sources of the autobicycle as well as some other functional components of the autobicycle while the rear side sectional chamber behind the engine may accommodate some functional components such as a carburetor and an air cleaner case. Thus, since the inside of each of the sectional chambers is cooled independently, the principal heat sources such as the engine are cooled within the front side sectional chamber so that the thermal influence which may be had on the rear sectional chamber side from the heat sources can be reduced remarkably, and the cooling efficiency within the rear sectional chamber is improved.

BRIEF DESCRIPTION OF THE DRAWINGS

The present invention will become fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
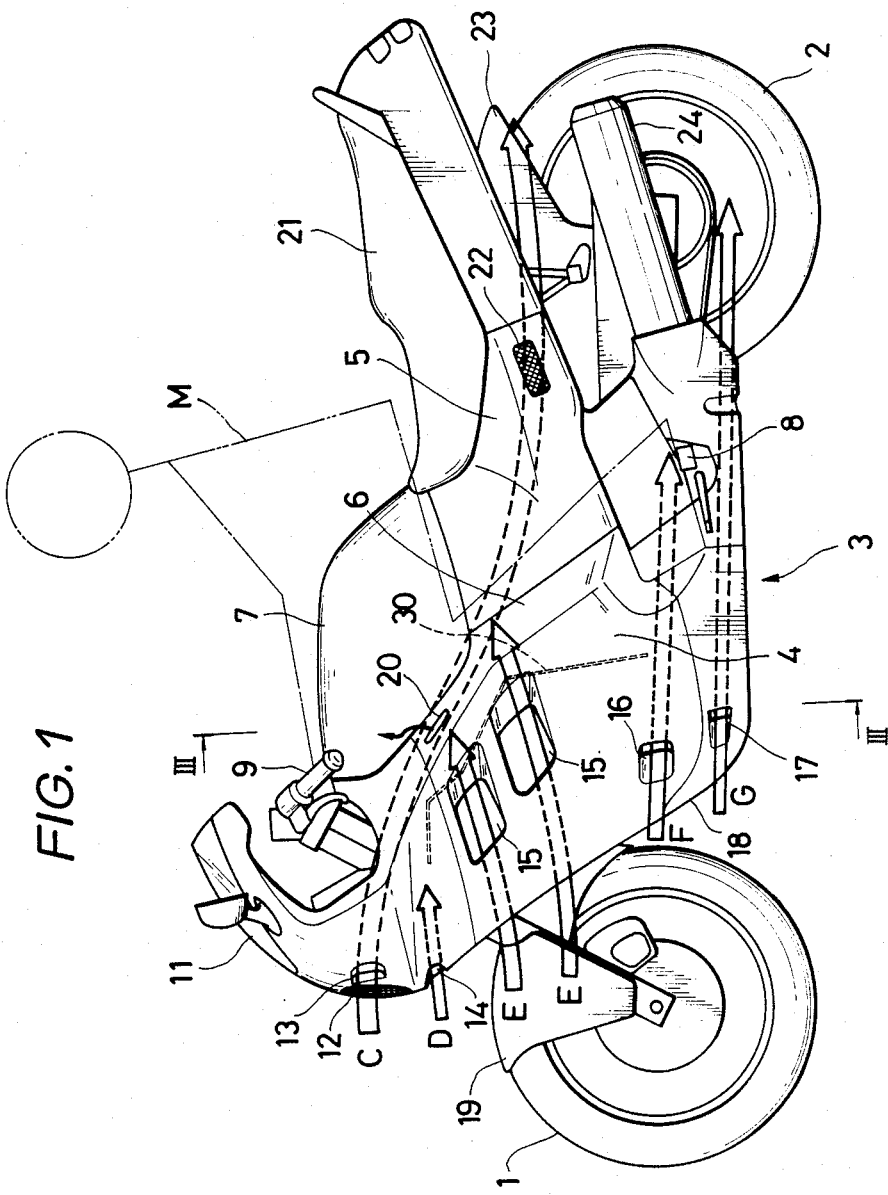
FIG. 1 is a side elevational view of an autobicycle according to a preferred embodiment of the present invention.
Figure 2:
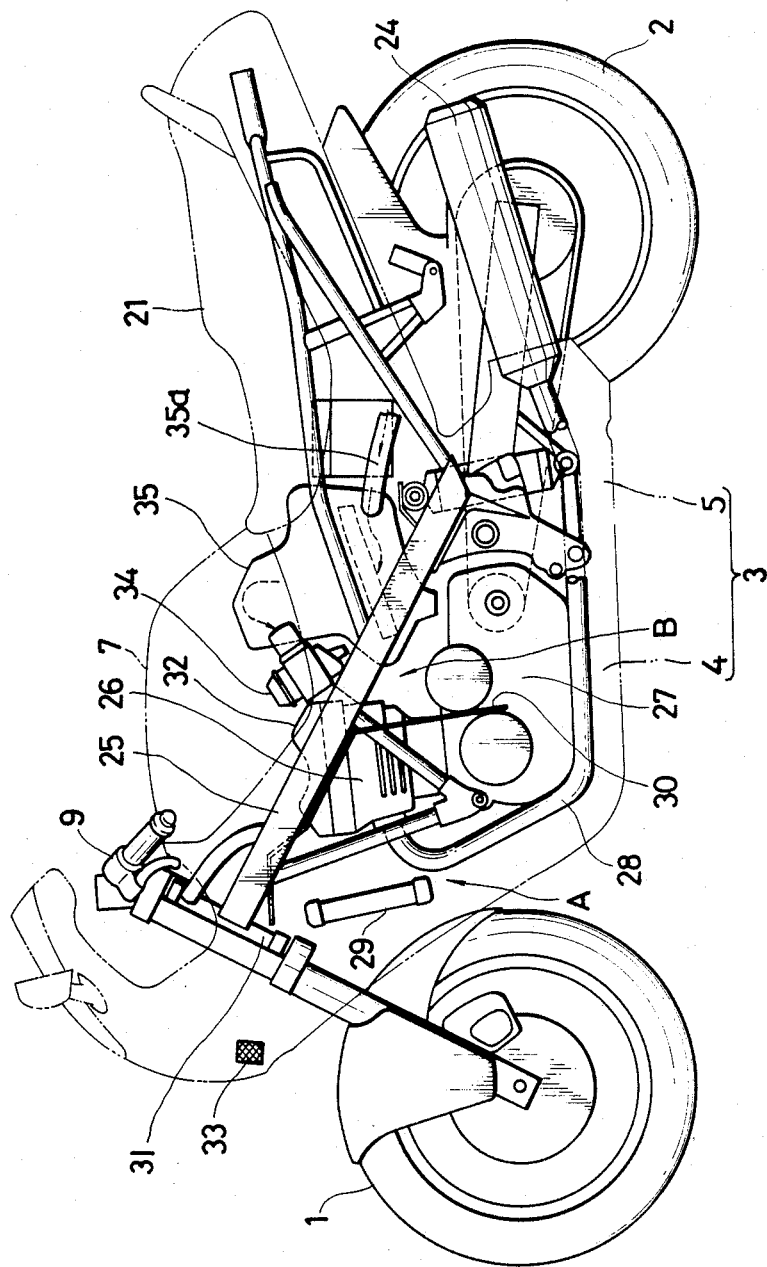
FIG. 2 is a similar view but showing the internal structure of the autobicycle of FIG. 1 with a body side cover thereof omitted.
Figure 4:
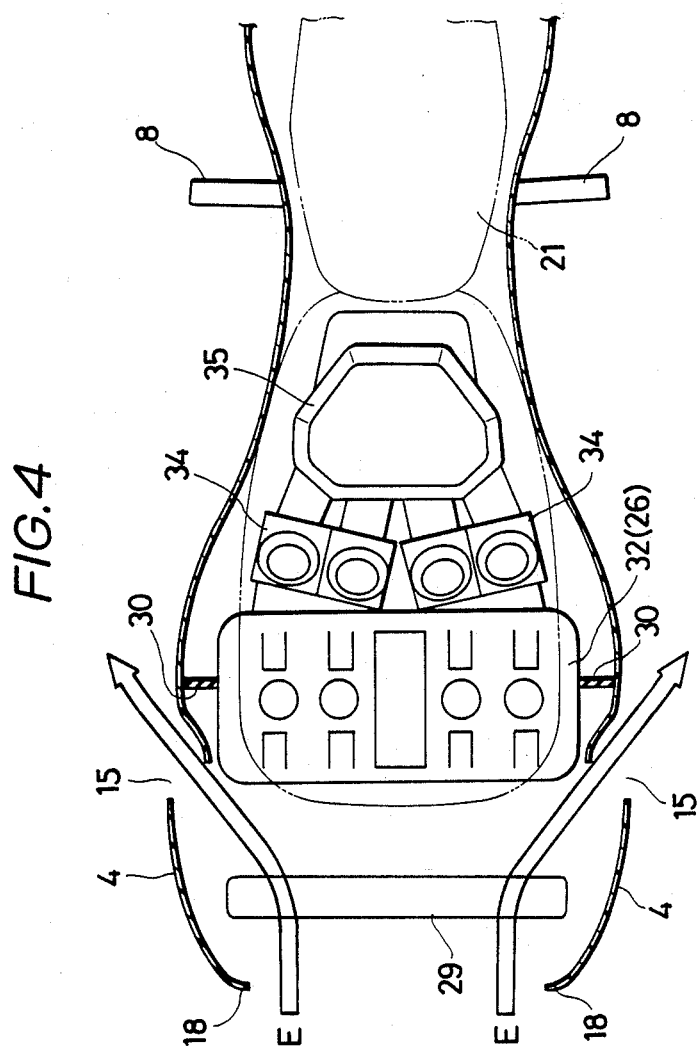
FIG. 4 is a horizontal sectional view, in an enlarged scale, of part of the autobicycle of FIG. 1.

Referring first to FIGS. 1 and 2, there is shown an autobicycle of a preferred embodiment of the present invention. The autobicycle shown includes a body side cover 3 which covers a side portion of a body of the autobicycle between a front wheel 1 and a rear wheel 2. The body side cover 3 is made of a known material such as a fiber reinforced plastics (FRP) material and consists of two parts including a fairing 4 on a front half portion of the body and a rear cowl 5 on a rear half portion of the body. The fairing 4 and the rear cowl 5 are connected to each other at a joint portion 6 so as to form the body side cover into that of the full cover type wherein opposite side portions of the body thereof are continuously covered over the substantially entire range thereof. The fairing 4 covers over a portion of the body below a tank 7 from a step 8 to a location in front of a handle 9. A screen 11 is located on a front portion of the body side cover 3, and a pair of rear chamber wind introducing holes 13 are perforated at positions of the fairing 4 on opposite sides of a light 12 while an oil cooler wind introducing hole 14 is perforated at a position of the fairing 4 below the light 12. Further, two pairs of wind exhausting holes 15 for a front sectional chamber are formed open at symmetrical left and right positions rearwardly of the central portion of the fairing 4 while a pair of case cooling wind introducing holes 16 and a pair of exhaust pipe cooling wind introducing holes 17 are formed open at lower symmetrical left and right positions of the fairing 4 as seen in FIG. 1. It is to be noted that, while not shown in FIG. 1 but as seen in FIG. 4, a radiator cooling large opening is formed in a known manner in a front portion 18 of the fairing 4, and a front fender 19 above the front wheel 1 is opposed to the opening. The joint portion 6 is formed on each of opposite left and right side portions of the body side cover 3 and is a stepped portion which is inclined from the fairing 4 toward the rear cowl 5 side, and a heat exhausting hole 20 is formed open above each of the joint portions 6 near an end portion of the joint portion 6 at which it is connected to the tank 7. This heat exhausting hole 20 is opened at a location rather spaced from a driver M of a boarding posture indicated by a torso line in FIG. 1, and accordingly it is effective, during stopping of the autobicycle, to externally discharge hot air coming up from within the autobicycle in such a manner that it may not directly come across the driver M. The rear cowl 5 covers a portion of the body rearwardly of the joint portions 6 and extends between a location below the tank 7 and a location below the seat 21. Further, an air cleaner inlet port 22 is formed open at each of opposite side portions of the rear cowl 5. Besides, a rear fender 23 for covering over an upper portion of the rear wheel 2 is located below a rear portion of the rear cowl 5, and a pair of wind introducing passages are provided by opposite left and right spacings formed between the rear cowl 5 and the rear wheel 2. Further, part of a muffler 24 is covered by a lower portion of the rear cowl 5.

Figure 3:
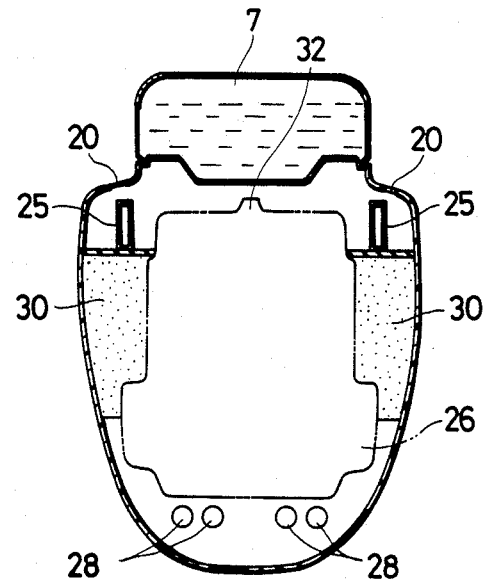
FIG. 3 is a sectional view, in a somewhat enlarged scale, taken along line III—III of FIG. 1.

Referring particularly to FIG. 2, an engine 26, a transmission case 27, exhaust pipes 28, a radiator 29 and so on are mounted on and located forwardly of a pair of body frames 25 on which the body side cover 3 is mounted. These elements are covered by the fairing 4. Further, a pair of partition walls 30 are located at a rear portion of the engine 26. Each of the partition walls 30 is formed such that it extends rearwardly along the corresponding body frame 25 from a location near a head pipe 31 located at a front end portion of the body frame 25, obliquely crossing a cylinder head 32 of the engine 26, to a location at the rear portion of the engine 26 and is bent downwardly here and depends to an intermediate portion of the transmission. The partition walls 30 are made of a suitable material such as a heat resisting rubber material adhered to a side wall of the engine 26 as shown in FIGS. 3 and 4, and an outer periphery of each of the partition walls 30 is closely contacted with and supported by an inner face of the fairing 4. Therefore, each of the partition walls 30 partitions the inside of the body side cover 3 into two front and rear parts to define a front chamber A which is a front side sectional chamber and a rear chamber B which is a rear side sectional chamber. It is to be noted that, as seen in FIG. 3, the partition walls 30 do not cover over the cylinder head 32. Accordingly, the front chambers A and the rear chambers B are not strictly separated from each other by the partition walls 30. This is because the cylinder head 32 does not present a very high temperature and, during driving of the autobicycle, most of the running wind which has cooled the inside of the front chambers A will flow from the front chambers A into opposite left and right sides or upper and lower sides of the body so that little wind will enter the rear chambers B. However, it is arbitrarily possible to cover the cylinder head 32 with the partition walls 30 is required. It is to be noted that, as shown in FIG. 3, a spacing for piping the exhaust pipes 28 is formed below the transmission case 27. The transmission case cooling wind introducing holes 16 and the exhaust pipe cooling wind introducing holes 17 both shown in FIG. 1 are communicated with this spacing. Further, an oil cooler 33 shown diagrammatically in FIG. 2 is located within the fairing 4 in an opposing relationship to an opening portion of the oil cooler wind introducing hole 14 so that it may be cooled directly by a running wind from the front fender 19.

Now, each sectional chamber is described more in detail. The front chamber A is a spacing which is covered by the fairing 4, and the engine 26 and the radiator 28 both being principal heat sources of the autobicycle as well as the transmission case 27 and part of the exhaust pipes 28 are located in the front chamber A. Meanwhile, the rear chamber B is a spacing which is covered by part of the fairing 4 and the rear cowl 5, and a carburetor 34 and an air cleaner case 35 both being functional parts of the autobicycle are located in the rear chamber B. It is to be noted that a suction duct 35a of the air cleaner case 35 is connected to the air cleaner inlet port 22 of the rear cowl 5 (refer to FIG. 1) so that it may introduce external air into the carburetor 34 as indicated by an arrow mark in broken line in FIG. 2.

Subsequently, flows of cooling winds will be described. Referring to FIG. 1, cooling winds C admitted into the autobicycle via the rear chamber wind introducing holes 13 will flow rearwardly above the partition walls 30 to supply fresh air into the rear chambers B. Consequently, the temperature of suction air to the air cleaner case 35 can be lowered significantly. Meanwhile, another cooling wind D admitted in via the oil cooler wind introducing hole 14 will flow rearwardly while cooling the oil cooler 33. Further, a further cooling wind E admitted in via the large opening of the front portion 18 of the fairing 4 will pass while cooling the radiator 29 as seen in FIG. 4, and then most of it will be separated in leftward and rightward directions by a front face of the engine 26 and will then go out from the wind exhaust holes 15. It is to be noted, that, as seen from FIGS. 1 and 3 the cooling winds E will naturally be separated also in upward and downward directions by the front faces of the engine 26 and the partition walls 30 and will then flow outside the body. In this instance, each of a pair of gaps between the rear portion of the engine 26 and the body side cover 3 is partitioned by the partition wall 30. Therefore, the cooling wind E cannot enter the rear chamber B beyond the engine 26 so that hot air within the front chamber A will not be supplied to the carburetor 34 nor to the air cleaner case 35. Meanwhile, still further cooling winds F admitted in via the case cooling wind introducing holes 16 will flow rearwardly while cooling the transmission case 27. Further, cooling winds C admitted in via the exhaust pipe cooling wind introducing holes 17 will flow rearwardly along the cooling exhaust pipes 28 while cooling the latter and will then go out from a rear end portion of the rear cowl 5. Since in this instance the cooling winds G act so as to draw out part of the cooling wind F, it has an additional function to promote flow of the cooling winds F. It is to be noted that while the cooling winds F, G flow from the front chambers A to locations below the rear chambers B, because they are running winds, they will flow rearwardly and accordingly there is fear that they may enter and thus heat the rear chambers B. Thus, the front chambers A are cooled mainly by the cooling winds E, F, G while the rear chambers B are independently cooled mainly by the cooling wind C. In the present embodiment, the partition walls 30 partition the inside of the body cover side portion 3 into the two chambers A, B and at the same time serve as wind introducing passages for cooling winds to the rear chambers B. Therefore, it can be readily attained to independently cool the inside of the rear chambers B while avoiding thermal influence of the front chambers A.

Figure 5:
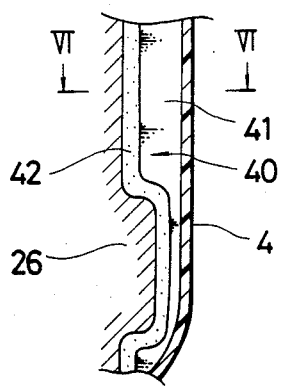
FIG. 5 is a horizontal sectional view of part of an autobicycle showing a second embodiment of the present invention.
Figure 6:
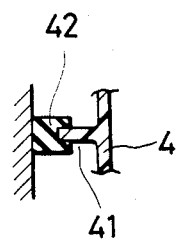
FIG. 6 is a sectional view taken along line VI—VI of FIG. 5.

FIGS. 5 and 6 illustrate another embodiment of the present invention. The autobicycle of the present embodiment is only different in structure of the partition walls from the preceding embodiment, and accordingly the other parts are denoted by like reference numerals to those used for the preceding embodiment. In FIG. 5, a portion corresponding to a portion of the right-hand side partition wall 30 of FIG. 3 is shown. A partition wall 40 in the present embodiment is formed by a rib 41 extending inwardly in an integral relationship from each of a pair of opposite side portions of a fairing 4, and a sealing member 42 made of a material such as heat resisting rubber is wrapped around an inner edge of the rib 41 such that it may fill a gap between the rib 41 and an opposing side wall of an engine 26. Due to this construction, when the fairing 4 is assembled, the partition walls 40 are formed at the same time with a high workability.

It is to be noted that the present invention is not limited to the embodiments described above and various modifications and applications are possible. For example, a partition wall can be formed as an independent exclusive wall by bending, for example, a single member in the form of a plate along a rear portion of an engine instead of forming a partition wall making use of a side wall of an engine as in the embodiments. Meanwhile, a body side cover may be of any type other than the full cover type only if it covers continuously from a side portion of an engine to a portion below a seat, that is, continuously over a principal heat source and some other functional parts.

As apparent from the foregoing description, the inside of a body side cover of an autobicycle according to the present invention is partitioned by a partition wall to define front and rear sectional chambers, and the sectional chambers are cooled independently of each other. Therefore, heat emitted from an engine and a radiator (in the case of an autobicycle of the water-cooled type) which are principal heat sources of the autobicycle is intercepted by the partition wall and accordingly is cooled within the front side sectional chamber without having a thermal influence on the rear side sectional chamber. Accordingly, the cooling efficiency of the rear side sectional chamber can be improved. In addition, since only provision of a partition wall is required, the cooling efficiency can be improved without the necessity of particularly changing the structure of a body side cover to increase the wind introducing area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle with a fairing comprising:
  a body frame having a front portion and a rear portion;
  an engine operatively mounted to said body frame, said engine including a cylinder projecting upwardly, said cylinder including a front portion and a rear portion;
  a seat mounted on said rear portion of said body frame;
  a fuel tank mounted adjacent to said seat on a front portion of said body frame;
  said fairing including a front cowl having an upper portion and a lower portion for covering the front portion of the body frame, a body side cover extending from said front cowl for covering a side portion of said engine and being positioned below said seat, said front cowl having at least one air introducing aperture disposed in said upper and lower portions and said body side cover having at least one air exhausting aperture;
  a partition wall including a first portion being substantially vertically mounted and extending between the rear portion of said cylinder and the fairing and a second portion being substantially horizontally mounted and extending between an upper portion of said cylinder and the fairing;
  said partition wall, said cylinder and said fairing defining a front sectional chamber with the front portion of said cylinder being disposed therein and a rear sectional chamber provided to the rear of said cylinder for containing portions of said fuel tank and a fuel supply apparatus;
  said lower aperture in said front cowl introducing air into said front-sectional chamber for cooling said engine and being exhausted therefrom through said at least one air exhausting hole to the atmosphere;
  said upper aperture in said front cowl introducing air into said rear sectional chamber for cooling portions of said fuel tank and fuel supply apparatus and being exhausted therefrom to the atmosphere.

2. The motorcycle with a fairing according to claim 1, and further including additional apertures in said lower portion of said front cowl for supplying additional air for cooling said engine and a transmission operatively connected to said engine.

3. The motorcycle with a fairing according to claim 1, wherein said partition wall is adhered at an edge thereof to a side wall of said engine and is contacted at another edge thereof with an inner face of said body side cover.

4. The motorcycle with a fairing according to claim 3, wherein said partition wall is constructed of a heat resisting rubber material.

5. The motorcycle with a fairing according to claim 1, and further including an air cleaner operatively disposed within said rear sectional chamber for supplying air to said engine.

6. The motorcycle with a fairing according to claim 5, and further including air cleaner inlet ports disposed within said body side cover for supplying air to said air cleaner.

7. The motorcycle with a fairing according to claim 1, wherein said partition wall is a rib formed integrally on and extending inwardly from an inner face of said body side cover until an inner edge thereof almost contacts with a side wall of said engine.

8. The motorcycle with a fairing according to claim 7, wherein a sealing member is attached along the inner edge of said rib for filling a gap between the inner edge of said body side cover and the side wall of said engine.

* * * * *